United States Patent [19]

Ritter et al.

[11] Patent Number: 4,762,946

[45] Date of Patent: Aug. 9, 1988

[54] ESTERS OF UNSATURATED CARBOXYLIC ACIDS

[75] Inventors: Wolfgang Ritter, Hilden; Wolfgang Zoellner, Duesseldorf, both of Fed. Rep. of Germany

[73] Assignee: Henkel Kommanditgesellschaft auf Aktien, Duesseldorf, Fed. Rep. of Germany

[21] Appl. No.: 851,981

[22] Filed: Apr. 14, 1986

[30] Foreign Application Priority Data

Apr. 15, 1985 [DE] Fed. Rep. of Germany ....... 3513356

[51] Int. Cl.$^4$ ...................... C07C 69/68; C07C 69/73
[52] U.S. Cl. ..................... 560/179; 526/321; 526/328; 526/272; 560/181; 560/202
[58] Field of Search ............... 560/179, 181; 526/321, 526/272

[56] References Cited

U.S. PATENT DOCUMENTS

| | | | |
|---|---|---|---|
| 1,775,636 | 9/1930 | Bogin et al. | 560/179 |
| 1,923,938 | 8/1933 | Kyrides | 560/179 X |
| 2,122,716 | 7/1938 | Graves | 560/179 |
| 2,211,625 | 8/1940 | Loder | 560/179 |
| 3,098,795 | 7/1963 | Kreps | 560/179 X |
| 3,726,653 | 4/1973 | van der Meij et al. | 44/62 |
| 3,854,893 | 12/1974 | Rossi | 44/62 |
| 3,951,929 | 4/1976 | Sweeney | 526/328 |
| 3,957,659 | 5/1976 | Kraats et al. | 252/8.3 |
| 4,110,283 | 8/1978 | Capelle | 252/8.3 X |
| 4,529,814 | 7/1985 | Fischer et al. | 560/181 X |

FOREIGN PATENT DOCUMENTS

| | | |
|---|---|---|
| 2047448 | 3/1972 | Fed. Rep. of Germany . |
| 3317396 | 11/1984 | Fed. Rep. of Germany . |
| 2058825 | 6/1980 | United Kingdom . |
| 2125805 | 7/1983 | United Kingdom . |

Primary Examiner—Werren B. Lone
Assistant Examiner—Vera C. Clarke
Attorney, Agent, or Firm—Ernest G. Szoke; Henry E. Millson, Jr.; Mark A. Greenfield

[57] ABSTRACT

Polymeric pour point depressants are described which are prepared from new esters of $\alpha,\beta$-olefinically unsaturated carboxylic acids of the formula

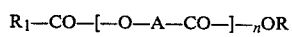

$$R_1-CO-[-O-A-CO-]-_nOR$$

wherein $R_1$—CO— is an $\alpha,\beta$-olefinically unsaturated carboxylic acid residue containing from 3 to 6 carbon atoms, R is a saturated or unsaturated hydrocarbon radical containing from 10 to 24 carbon atoms, —[—O—A—CO—]— is a residue of a hydroxycarboxylic acid having from 2 to 6 carbon atoms, A is an aliphatic radical having from 1 to 5 carbon atoms, and n is a number having a value of from 1 to 18.

25 Claims, No Drawings

ESTERS OF UNSATURATED CARBOXYLIC ACIDS

BACKGROUND OF THE INVENTION

1. Field of the Invention

This invention relates to new esters of olefinically unsaturated, carboxylic acids containing an ester residue of an hydroxycarboxylic acid-alcohol adduct and polymeric compounds obtained therefrom by homo- or copolymerization. The oil-soluble polymers are excellent flow promoters or crystallization inhibitors for paraffin- and/or wax-containing hydrocarbon mixtures, especially mineral oils. Therefore, the oil-soluble polymers comprise effective pour point depressants, for example, for paraffin-containing crude oils.

2. Description of Related Art

During crude oil shortages, there generally is a steady increase in the production and processing of oils having a relatively high content of high melting point, paraffinic hydrocarbons, i.e., hydrocarbons which are solid at room temperature. Crystallization of the relatively high-melting point constituents causes these oils to lose their fluidity on cooling, e.g., to ambient temperatures. In order to avoid problems during production, transport and processing of these oils, so-called flow or fluidity promoters, also known as crystallization inhibitors and pour point depressants, normally are added to warm crude oil, typically as it accumulates at the well. As long as the oil is warm, the normally solid paraffins remain in solution. The flow promoters, which are generally polymeric materials, prevent the formation of relatively large aggregates of paraffin crystals and, in so doing, improve the crude oil's fluidity. The improved fluidity is evidenced by a reduction in the oil's pour point, i.e., the lowest temperature at which the crude oil is fluid as defined by a standard method, hence the alternative identification of these additives as pour point depressants. These materials also are used for reducing the pour point of diesel oil and lubricating oils.

Several polymeric pour point depressants are known. German Offenlegungsschrift No. 22 64 328 describes using polymeric acrylates (alcohol esters) containing from 18 to 24 carbon atoms in the alcohol moiety. One disadvantage of these compounds is that high concentrations, e.g., from about 0.01 to 3% by weight, based on the crude oil, must be used to be effective. Another disadvantage is that stock solutions of these flow promoters, usually a 30 to 50 wt. % solution in toluene, are very difficult to handle at temperatures of lower than about 15° C.

Similar disadvantages also are encountered using the polymeric(methy)acrylic acid esters described in German Offenlegungsschrift No. 32 26 252 (Great Britain No. 2,125,805A). The long-chain alcohol ($C_{14}$–$C_{22}$) residues of these esters have been chain-extended by reaction with ethylene oxide and/or propylene oxide. Even though these products are effective pour point depressants at lower concentrations, stock solutions are virtually impossible to handle at temperatures below about 0° C.

An object of the present invention is to provide new oil-soluble monomers which may be polymerized to homo- and/or copolymers having improved properties as flow promoters. In particular, it is an object of the present invention to provide a pour point depressant which can be handled at a temperature of below about 0° C. as a comparatively concentrated stock solution.

DESCRIPTION OF THE INVENTION

In a first aspect, the present invention relates to new esters of $\alpha,\beta$-olefinically unsaturated, carboxylic acids corresponding to the following general formula $$R_1-CO-[-O-A-CO-]_n-OR \quad (I)$$

wherein $R_1$—CO— represents an $\alpha,\beta$-olefinically unsaturated carboxylic acid residue containing from 3 to 6 carbon atoms, R is a saturated or unsaturated hydrocarbon radical containing from 10 to 24 carbon atoms, —[O—A—CO—] is a residue of a hydroxycarboxylic acid having from 2 to 6 carbon atoms, A is an aliphatic radical of from 1 to 5 carbon atoms, and n is a number of from 1 to 18.

In another aspect, the present invention relates to homopolymers and copolymers produced from the esters of formula (I). The present invention further relates to a process for preparing the esters of formula (I), to the preparation of oil-soluble homopolymers and copolymers using these esters and to the use of such polymers as flow promoters or pour point depressants in hydrocarbon mixtures, e.g., in paraffin- and/or wax-containing mineral oils, particularly crude oils.

The esters of the present invention, which are useful as monomers for preparing the polymers of the present invention, are composed of three basic subunits (see formula (I)), namely (a) a group —OR derived for example from a primary, preferably linear, saturated or unsaturated alcohol containing from 10 to 24 carbon atoms, (b) an intermediate group [—O—A—CO—]$_n$ derived from a hydroxy carboxylic acid containing from 2 to 6 carbon atoms and/or oligomers thereof having an average degree of oligomerization of from 1 to 18 and preferably from 1 to about 10 (i.e., not greater than about 10), and (c) a group $R_1$—CO— which is a residue of a polymerizable $\alpha,\beta$-olefinically unsaturated carboxylic acid, preferably acrylic, methacrylic fumaric, crotonic, itaconic or maleic acid.

To produce the esters of the present invention, a primary mono-functional alcohol, from which the terminal group —OR is derived, preferably is used as the starting material. The alcohol contains from 10 to 24 carbon atoms, preferably from 12 to 22 carbon atoms, and may contain either an even or odd number of carbon atoms. Alcohols containing an even number of carbon atoms preferably are used. Suitable alcohols may be saturated or ethylenically unsaturated. Unsaturated alcohols may have up to three C=C double bonds in either the cis or trans configuration. The double bonds may be conjugated but preferably are in isolated form.

A preferred class of alcohols is the fatty alcohols. In the context of the present invention, fatty alcohols include monofunctional primary alcohols produced from fatty acids or fatty acid mixtures. The alcohols correspond to the parent fatty acids in their chain length, chain length distribution and in the number and position of the double bonds. Purified or refined fatty alcohols, e.g., consisting predominantly of one chemical species or a particular mixture of species also are suitable. Fatty alcohols containing from 12 to 22 carbon atoms and, more especially, fatty alchols containing 16, 18 and 22 carbon atoms are preferred.

In particularly preferred embodiments of the present invention, the —OR group originates from tallow alcohol, from technical grade stearyl alcohol or from a fatty alcohol mixture containing a relatively high percentage of an unsaturated fatty alcohol, such as oleyl alcohol.

In addition to fatty alcohols derived from natural fatty acids, oligomerization products of ethylene containing a terminal OH-group also can be the source of the —OR moiety. Oligomerization products such as these are well known to those skilled in the art and are obtained by a Ziegler-type synthesis reaction. These products are commercially available, for example, under the mark ALFOL. The chain length of these compounds suitable for use in the present invention corresponds to the fatty alcohols mentioned above.

In order to prepare the novel esters of formula (I), each mol of the alcohol first is subjected to a chain-extending reaction with a hydroxycarboxylic acid, the number of mols of the hydroxycarboxylic acid generally corresponding to the desired degree of oligomerization of the intermediate group.

In accordance with the present invention, hydroxycarboxylic acids containing from 2 to 6 carbon atoms are used. Both linear and branched acids may be used. Preferred examples include glycolic acid, 2- and 3-hydroxypropanoic acid, and more particularly the isomers or isomer mixtures or lactic acid, hydroxybutanoic acids, (e.g., 4-hydroxybutyric acid), hydroxypentanoic acids and hydroxycaproic acids, (e.g., 6-hydroxycaproic acid). Typically, mono-hydroxy mono-carboxylic acids containing a primary hydroxyl group are employed.

The total chain length of the intermediate group is expressed by the so-called degree of oligomerization (n) which indicates the average number of hydroxycarboxylic acid molecular units attached during the condensation reaction. As readily apparent to those skilled in this art, the degree of oligomerization is readily determined from the number of mols of hydroxycarboxylic acid(s) employed per mol of alcohol (HOR) in the formation of the ester product. For example, use of one mol of hydroxycarboxylic acid per mol of alcohol represents a degree of oligomerization of 1.

According to the present invention, good results are obtained using esters wherein the intermediate group consists of only one molecular unit of the above-mentioned hydroxycarboxylic acid (i.e., n equals 1 in formula (I)). However, it also is possible to use esters having longer intermediate groups consisting of several identical or different hydroxycarboxylic acid residues. In fact, within the broad scope of the present invention, n can be a number having a value of up to about 18. Preferably, when using more than 1 mol of hydroxycarboxylic acid per mol of alcohol, the degree of oligomerization is up to about 10 (i.e., no more than about 10). Average degrees of oligomerization of from about 2 to 4 and, more particularly, around 3 are particularly preferred. Thus, n will have a value within the range of 1 and 18, preferably within the range of 2 and 10 and more preferably within the range of 2 and 4.

In addition to or instead of a hydroxycarboxylic acid, per se, it also is possible to use reactive derivatives thereof for reaction with the primary alcohol. For example, it is possible to use alcohol-derived esters of the hydroxycarboxylic acids, for example the esters of monofunctional, readily volatile alcohols (e.g., lower alkanols), preferably methyl alcohol or ethyl alcohol. In addition, cyclic esters of hydroxycarboxylic acids or oligomers of the hydroxycarboxylic acids also may be used. As used herein, the phrase "reactive derivative of a hydroxycarboxylic acid" includes lower alkanol esters of the noted hydroxycarboxylic acids, cyclic esters of the hydroxycarboxylic acids and pre-reacted oligomers of the hydroxycarboxylic acids. Accordingly, suitable raw materials for reaction with the primary, mono-functional alcohols further include, for example, lactides, glycolides and even lactic acid ethyl ester.

Esterification of the monofunctional alcohol with the hydroxycarboxylic acid or the reactive derivative thereof is carried out, for example, at a temperature of from about 80° to 230° C., for a period of time between about 3 to 5 hours. Although not critical, the chain-extending reaction between the primary alcohol and the hydroxycarboxylic acid or reactive derivative thereof may be acid- or alkali-catalyzed. Alkaline catalysis, for example, using sodium methylate, is preferred for example where lactic acid ethyl ester is used as an hydroxycarboxylic acid derivative. Where the primary monofunctional alcohol is reacted with a lactide, tin (II) chloride ($SnCl_2$) is a suitable catalyst. The water or the readily volatile alcohol component formed during the esterification reaction may be removed from the production using a stream of nitrogen or, alternatively, the esterification reaction may be carried out in a solvent which forms an azeotrope with the by-product, e.g., water. Techniques and equipment suitable for carrying out this esterification procedure are well known and need not be described in detail. Similarly, alternate conditions and procedures for conducting the esterification process, including the use of other reactive derivatives of the alcohol and acid starting materials, will be apparent to those skilled in the art.

The intermediate product thus produced corresponds to the following general formula $$X-[-O-A-CO-]-_nOR \qquad (II)$$

wherein R represents a saturated or unsaturated hydrocarbon radical containing from 10 to 24 carbon atoms derived from the alcohol, —O—A—CO— is an intermediate group constituting the residue of a hydroxycarboxylic acid, A is an aliphatic radical having from 1 to 5 carbon atoms, preferably an aliphatic hydrocarbon radical, n is a number having a value of from 1 to 18 denoting the degree of oligomerization of the hydroxycarboxylic acid and X is a hydrogen atom or a radical reactive in the subsequent esterification used to prepare the ester of formula (I).

The formula (II) compounds also are new. Besides having utility as an intermediate in the preparation of the esters of formula (I), these compounds also can be used in preparing a variety of polymer materials, e.g., polyurethanes, using known reactions. The present invention, therefore, also relates to the compounds corresponding to formula (II) and to their preparation.

To prepare the formula (I) esters (carboxylate), the formula (II) compounds are reacted (esterified) with an α,β-olefinically unsaturated carboxylic acid. The —OX group of the formula (II) compound is esterified with the α,β-olefinically unsaturated carboxylic acid. Preferred unsaturated carboxylic acids are acrylic acid and/or methacrylic acid, although maleic acid, fumaric acid, itaconic acid or crotonic acid also are suitable. Dicarboxylic acid esters of formula (I) are usable either in the form of a mixed ester or a semiester. In the case of a semiester, one carboxyl group of the original dicarboxylic acid remains free. In the mixed ester this free carboxyl group is present in a reacted form, more especially as an ester group with another alcohol $R_2OH$, where $R_2$ may be a linear or branched hydrocarbon radical containing up to 10 and preferably up to 6 (i.e., no more than 6) carbon atoms. Methacrylic acid esters of formula (I) are preferred because they are relatively easy to produce.

When the formula (II) compound is esterified with the unsaturated carboxylic acid, for example, acrylic acid or methacrylic acid, it is important to avoid premature polymerization. This can be accomplished by carrying out the esterification using any of the known methods for producing long-chain esters of these unsaturated acids. One such method is described, for example, in German Auslegeschrift No. 29 26 474 (Great Britain No. 2,058,825A). A useful process is acidic esterification, for example, using 4-toluene sulfonic acid as an esterification catalyst, under reflux conditions in toluene in the presence of a polymerization inhibitor such as phenothiazine or hydroquinone. Depending on the solvent, the esterification is carried out at a temperature between about 70° and 170° C. Generally, under these conditions the esterification requires a reaction time between about 5 to 10 hours. Water is removed during the reaction.

The formula (I) monomeric esters particularly the esters of acrylic or methacrylic acid, are readily polymerizable. Polymerization may be effected by heating the monomers in a known manner in the presence of radical-forming components (free radical polymerization initiators), for example azo compounds such as azoisobutyronitrile or peroxides such as benzoyl peroxide. As recognized by those skilled in this art, a chain-forming reaction then takes place at a temperature at which a sufficient number of radicals is formed. Suitable procedures and equipment for accomplishing the polymerization are well known to those skilled in the art and require no detailed elaboration. For example, the polymerization can be carried out at a temperature within the range of about 50° to 150° C., preferably 80° to 120° C.—the reaction time being a function of temperature. At 100° C., the reaction time may be about 2 hours.

Polymers of these esters also may be produced using solution polymerization techniques in organic solvents or alternatively using known emulsion polymerization techniques. The behavior during polymerization of the esters of the present invention does not differ significantly from the behavior of other long-chain acrylic and/or methacrylic acid esters. The polymerizable group (i.e., the C=C double bond) typically behaves as if it were "diluted" by the long side chains.

Preparation of homo- and/or copolymers using the formula (I) polymerizable esters preferably is done using solution polymerization. Polymerization may be accomplished at a temperature of from about 80° to 100° C. in apolar solvents, such as aliphatic or aromatic hydrocarbons, using azo compounds, such as azoisobutyronitrile, or peroxides, such as benzoyl peroxide or lauryl peroxide as free radical initiators. Toluene is a preferred solvent. The quantity of initiator normally used amounts to between about 1 and 10 mol % and preferably between about 2 and 4 mol %, based on the total quantity of monomers. In individual cases, regulators also can be used to obtain low-viscosity products which are easier to handle at low temperatures. Suitable regulators include, for example, mercapto compounds, such as linear or branched mercaptans containing 12 carbon atoms, and esters of mercaptocarboxylic acids, such as thioglycolic acid. Generally, the monomer concentration in the solvent is more than 20% by weight. Preferably, the monomer concentration is about 50% or higher.

The formula (I) monomeric esters may be polymerized to form polymers of very high molecular weight. Thus, a molecular weight (number average) of more than about 50,000 or even more than about 100,000 may be obtained from these esters at low temperatures using emulsion polymerization techniques and a small quantity of initiator. However, molecular weights of from about 1000 to about 50,000 and preferably from about 10,000 to about 30,000 are preferred for polymers to be used as flow promoters for paraffin-containing oils. Such polymers can be obtained using preferred solution polymerization procedures. The molecular weight of the polymer may be adjusted by any of the methods normally used in the polymerization art. For example, comparatively low molecular weights can be obtained by conducting the polymerization at a relatively high temperature,
increasing the quantity of initiator relative to the reactants, and/or
using known regulators or regulating solvents.

Practically speaking, the exact molecular weight of the polymer often is difficult to determine; thus those skilled in the art generally are guided instead by solution viscosity in order to obtain desired polymers. In this regard, polymers useful as pour point depressants in accordance with the present invention preferably have a specific viscosity (as measured using a 1% (by weight) solution of the polymer in toluene) of from about 0.01 to 1.0 and preferably from about 0.05 to 0.5.

As those skilled in the art will readily appreciate, the monomeric esters of the present invention also are copolymerizable with other unsaturated monomers. For example, they may be copolymerized with other esters of methacrylic acid or acrylic acid, e.g., alcohol esters containing from 1 to 22 carbon atoms in the alcohol moiety. Suitable long-chain esters are the (meth)acrylates of behenyl alcohol or even of $C_{18}$ or $C_{16}$ alcohols which also may contain double bonds. The monomeric esters also may be copolymerized with styrene or with nitrogen-containing monomers, such as amides of acrylic and/or methacrylic acid and dialkylaminoalkyl(meth)acrylates.

When preparing copolymers for use as pour point depressants, it is advantageous to use the formula (I) monomers at least in an equal molar quantity relative to other monomers, but preferably in a molar excess. Accordingly, suitable copolymers contain no more than about 40 mol %, preferably no more than about 20 mol % and, more preferably, no more than about 15 mol % of other co-monomers. Co-monomers suitable for preparing pour point depressants include, for example, optionally N-substituted acrylamides or methacrylamides, for example, N-alkylamino(meth)acrylamides. In these co-monomers, the alkyl radicals attached to the amide nitrogen contains for example from 1 to 6 carbon atoms and preferably from 1 to 4 carbon atoms. Other suitable co-monomers include unsaturated carboxylic acids, such as acrylic acid, methacrylic acid, itaconic acid, maleic acid, fumaric acid and/or crotonic acid. In addition, basic monomers, such as dimethyl- or diethylaminoethyl methacrylate or the corresponding acrylates or diethylaminopropyl methacrylamide also can be used.

In certain cases, it also has proven to be advantageous to add polymerizable esters of $C_1$–$C_4$ alcohols, such as butylacrylate, propylacrylate, methyl-methacrylate, ethylacrylate or methacrylate. These compounds may be used either individually or together with the above-mentioned co-monomers. In either case the sum of the aforementioned co-monomers should preferably not exceed about 40 mol %.

In one embodiment of the present invention, co-monomers suitable for copolymerization with the formula (I) esters are, in particular, copolymerizable components of the type described in the relevant pour point depressant or crystallization inhibitor prior art. These copolymerizable components include comparatively long-chain derivatives of acrylic and/or methacrylic acid, cf. the disclosures of the above-mentioned German Offenlegungsschrift Nos. 22 64 328 and 32 26 252. Other relevant publications include German Auslegeschrift Nos. 22 10 431 and 26 12 757 (U.S. Pat. No. 4,110,283) and German Offenlegungsschrift Nos. 20 62 023, 23 30 232, (U.S. Pat. No. 3,854,893), 19 42 504, 20 47 448, 24 13 439 and 33 17 396. In cases where copolymerizable components are used which are themselves effective as pour point depressants, the above-noted limitations on the molar fraction of co-monomers suitable for reaction with the formula (I) esters can be relaxed somewhat. In particular, co-monomers which are effective as pour point depressants themselves may comprise more than 50 mol % of copolymers according to the present invention, for example up to 60 mol %, 70 mol % or even up to 80 mol %.

The homo- and copolymers of the present invention have a pronounced flow-promoting effect and remain sufficiently fluid, even in highly concentrated solutions, for example as 50% by weight solutions in toluene, that they can be used at temperatures of below about 0° C. without extraordinary precautions. In fact, the pour point of polymer stock solutions of the present invention are in some cases as low as −18° C.; which should be compared with a pour point of 0° C. for the product of German Auslegeschrift No. 32 26 252.

As a pour point depressant for mineral oils, the homo- and copolymers of the present invention are used, for example, in qualities of from about 20 to 400 ppm and more especially in qualities of from about 40 to 200 ppm.

Good flow-promoting effects are obtained using polymers based on the formula (I) esters in which the intermediate group —[—O—A—CO—]— is derived from lactic acid or oligomers thereof and the group —OR of the alcohol contains at least 16 carbon atoms.

The following Examples are intended to illustrate the present invention without limiting its scope in any way, which is defined in the appended claims.

EXAMPLE 1

This example describes the preparation of a compound of formula (II) and particularly illustrates the chain extension of a monohydroxy material (tallow alcohol) with glycolic acid.

General procedure:

All the reactants were introduced into a 500-ml-three-necked flask equipped with a KPG stirrer having a PTFE blade, a thermometer, a nitrogen inlet and a distillation bridge with a condenser, receiving flask and bubble counter. The reaction vessel are evacuated four times purged with nitrogen after each evacuation and then heated to a bath temperature of 180° C. in a gentle stream of nitrogen. At a sump temperature of approx. 80° C., the reaction mixture melted. Thereafter, the bath temperature was increased to 230° C. at a rate of 10° C. every 15 minutes. Water of reaction began distilling off once the bath temperature reached 190° C. (sump temperature of 155° C.). At the end of the reaction, the sump temperature was 200° C. The reaction mixture then was allowed to cool to 150° C. and residual water was removed via a water jet vacuum. The product was packed under a nitrogen atomsphere while still hot. The overall reaction times were normally from 3 to 4 hours. Results are presented below in Table 1.

TABLE 1

| Test number | Mols of Reactants | | color and consistency | Product Properties | | acid number |
|---|---|---|---|---|---|---|
| | tallow alcohol | glycolic acid | | Hydroxyl number | | |
| | | | | theor. | found | |
| 1a | 1 | 1 | light beige, solid | 176.4 | 181.2 | 4.8 |
| 1b | 1 | 2 | light beige, solid | 143.2 | 148.1 | 17.2 |
| 1c | 1 | 4 | light beige, solid | 114.1 | 101.2 | 24 |
| 1d | 1 | 8 | white | — | — | 37 |

EXAMPLE 2

This example describes the preparation of another compound of formula (II) and specifically illustrates the chain extension of a monohydroxy material (tallow alcohol) with lactic acid ethyl ester.

General procedure:

Tallow fatty alcohol and lactic acid ethyl ester were introduced into the apparatus described in Example 1. The reaction vessel was evacuated four times, purged with nitrogen after each evacuation and then heated to a bath temperature of about 160° C. in a gentle stream of nitrogen. When the reaction mixture had melted, at a sump temperature of approx. 60° C., 340 mg of a 30% by weight solution a $NaOCH_3$ in methanol were added per each mol of lactic acid ethyl ester. Thereafter the reaction mixture was slowly heated—the first ethanol distillate occurred at a bath temperature of approx. 190° C. (sump temperature approx. 150° C.). The bath temperature was then gradually increased to 230° C. When ethanol distillation ceased, the reaction mixture was left to cool to just above its crystallization temperature, after which a water jet vacuum was applied. The reaction mixture then was slowly heated to 150° C. to distill off the remaining ethanol via the water jet vacuum. The product was packed while still hot. Results are presented below in Table 2.

TABLE 2

| Test number | Mols of Reactants | | color and consistency | ethanol dist. off (%) | Product properties | | acid number |
|---|---|---|---|---|---|---|---|
| | tallow alcohol | lactic acid ethyl ester | | | Hydroxyl number | | |
| | | | | | theor. | found | |
| 2a | 1 | 1 | light | 98 | 168.9 | 176.9 | 0.3 |

TABLE 2-continued

| Test number | Mols of Reactants | | | ethanol dist. off (%) | Product properties | | |
|---|---|---|---|---|---|---|---|
| | tallow alcohol | lactic acid ethyl ester | color and consistency | | Hydroxyl number | | acid number |
| | | | | | theor. | found | |
| 2b | 1 | 2 | yellow, solid | 100 | 138.9 | 151.3 | 0.4 |
| 2c | 1 | 4 | light yellow, solid, greasy | 100 | 102.3 | 145.6 | 1.5 |
| 2d | .1 | 8 | brown, liquid with crystal sludge | 96 | — | — | — |
| | | | black, thinly liquid | | | | |

EXAMPLE 3

This example describes the preparation of a compound of formula (II) and particularly illustrates the chain extension of a monohydroxy compound with lactide.

General procedure:

Alcohol, lactide and for each mol of lactide—2.3 ml of a solution of tin (II) chloride in ether, the solution having 2.5 mg of $SnCl_2$ per ml of ether, were combined in the apparatus of Example 1. The apparatus was evacuated four times and purged with nitrogen. The components were heated for 1 hour to 190°–195° C. in a gentle stream of nitrogen, and were reacted for 3 to 3.5 hours at 190° to 195° C. The recovered product was packed while still hot. Results are presented below in Table 3.

TABLE 3

| Test number | Reactants | | Product properties | | |
|---|---|---|---|---|---|
| | alcohol | lactide (mol per mol of alcohol) | consistency/ color | Hydroxyl number | |
| | | | | theor. | found |
| 3a | decanol | 0.5 | liquid, colorless | 244 | 239 |
| 3b | decanol | 2 | liquid, colorless | 126 | 117 |
| 3c | tallow fatty alcohol | 0.5 | wax-like, white | 167 | 169 |
| 3d | tallow fatty alcohol | 1 | wax-like, white | 137 | 143 |
| 3e | tallow fatty alcohol | 2 | wax-like, white | 112 | 107 |
| 3f | tallow fatty alcohol | 4 | wax-like, white | 67 | 73 |
| 3g | behenyl alcohol | 0.5 | colorless, cloudy, solid | 242 | 132 |
| 3h | behenyl alcohol | 2 | colorless, cloudy, solid | 92 | 88 |

EXAMPLE 4

This example describes the preparation of methacrylates corresponding to formula (I).

0.3 mol of each of the adducts described in Examples 1 through 3, 0.3 mol of methacrylic acid and—based in each case on the above-mentioned reactants—1% by weight hydroquinone, 5% by weight p-toluene sulfonic acid and 200 ppm of phenothiazine were dissolved in toluene in a three-necked flask equipped with a water separator. The concentration of solids in the reaction mixture was approximately 55% by weight.

The reaction mixture was heated to boiling and the reaction was continued at the boiling temperature of the toluene until the water of reaction had been quantitatively separated. Reaction times were normally from about 5 to 10 hours. After cooling, the reaction mixture was neutralized with 20% by weight sodium hydroxide solution, dried using sodium sulfate and then filtered off under suction through filter aids (Primisil). The product, comprising a solution in toluene, then was stabilized with 500 ppm of hydroquinone and concentrated at a temperature of 60° C. in a rotary evaporator.

The resulting methacrylates (MA) of the Examples 1 through 3 adducts are characterized below in Table 4.

EXAMPLE 5

This example describes the preparation of polymers using some of the methacrylates of Example 4.

The methacrylates described in Example 4 were homo-polymerized (HP) or were copolymerized (CP) with methacrylamide in a toluene solution.

(a) General procedure for producing the homopolymers (HP)

0.08 mol of the methacrylates (about 100 parts by weight) described in Example 4 were dissolved in 60 parts by weight of toluene. The mixture was heated with stirring to 80° C. and then 1.6 mmol of azo-bis-isobutyronitrile (AIBN) dissolved in 40 parts by weight of toluene were added dropwise over a period of about 1 hour. After that hour, polymerization was continued for another hour at about 100° C.

(b) General procedure for producing the copolymers (CP)

Polymerization was carried out in the same way as in (a), except that the monomer mixture consisted of 0.08 mol of the methacrylate described in Example 4 and 0.02 mol of methacrylamide. The properties of the polymers are shown in columns four through seven in Table 5 below.

Measurement of pour point depression 100 ppm of the flow promoter to be tested were added to a solution of 85 parts by weight of white spirit (Bp. 145°–200° C.) and 15 parts by weight of a paraffin (setting point 46°–48° C.). 15 ml of this solution were sealed in a test tube, and cooled while turning for 1 hour in a freezer. Final temperature approx. −20° C. The contents of the test tube then were allowed to thaw at room temperature while the test tube continued to rotate. The pour point is reached when the entire content of the test tube flows. The pour point depression is the difference in temperature between untreated and treated test solutions. The more effective the product is as a pour point depressant the greater this difference. The measurement results obtained are shown in Table 5 below.

TABLE 4

| No. | Formula (II) Reactant | Gross yield % | OH (hydroxyl) number | Acid number | Color | Consistency |
|---|---|---|---|---|---|---|
| 4.1.a | 1a | 96 | — | 0 | light brown | almost solid |
| 4.1.b | 1b | 79 | — | 0 | light brown | pasty |
| 4.1.c | 1c | 69 | — | 0 | brown | pasty |
| 4.1.d | 1d | 45 | — | 1.7 | brown | pasty |
| 4.2.a | 2a | 97 | — | 0 | dark brown | thinly liquid |
| 4.2.b | 2b | 98 | — | 0 | black-brown | thinly liquid |
| 4.2.c | 2c | 93 | — | 0 | black-brown | thinly liquid |
| 4.2.d | 2d | 96 | — | 0.6 | black | liquid |
| 4.3.a | 3a | 98 | 12.7 | 1.0 | yellow | thinly liquid |
| 4.3.b | 3b | 96 | 21.2 | 2.8 | green-brown | highly viscous |
| 4.3.c | 3c | 97 | 8.5 | 0 | brown | liquid |
| 4.3.d | 3d | 98 | 9.6 | 5.1 | dark brown | liquid |
| 4.3.e | 3e | 94 | 18.8 | 1.1 | green-brown, cloudy | viscous |
| 4.3.f | 3f | 80 | 18.6 | 1.8 | green-brown, cloudy | highly viscous |
| 4.3.g | 3g | 97 | 25.6 | 4.3 | dark brown | pasty |
| 4.3.h | 3h | 97 | 36.0 | 11.1 | brown | pasty |

TABLE 5
Properties of the polymers

| No. | Monomer | Polymer | Solids content % by weight | Viscosity mPa.s | Color | Consistency | Pour point depression (°C.) |
|---|---|---|---|---|---|---|---|
| 6 | 4.2a | homopolymer | 43 | ~240 | brown, cloudy | thinly liquid | 11 |
| 7 | 4.2a | copolymer | 42 | 31 800 | brown, cloudy | highly viscous | 4 |
| 8 | 4.2b | homopolymer | 42 | 320 | yellow-brown, cloudy | liquid | 10 |
| 9 | 4.2b | copolymer | 38 | 7 700 | yellow-brown, cloudy | viscous | 6 |
| 10 | 4.2c | homopolymer | 34 | ~120 | black-brown, clear, sediment | thinly liquid | 11 |
| 11 | 4.2c | copolymer | 34 | 670 | black-brown, cloudy, sediment | liquid | 11 |
| 12 | 4.3d | homopolymer | 39 | 400 | yellow-brown, cloudy | liquid | 10 |
| 13 | 4.3e | homopolymer | 25 | 430 | yellow-brown, cloudy | liquid | 8 |

Critical to the practical application of these pour point depressants, for example in colder regions, is the pour points exhibited by their 50% (by weight) solution in toluene. Products 10 (pour point −14° C.), 11 (−18° C.), 6 (−7° C.) and 8 (−7° C.) are mentioned by way of example. Most commercial products now have pour points of about +10° to +16° C. (again in the form of 50% solutions in toluene, which is standard practice). This serious practical disadvantage (need to melt before use, etc.) cannot be eliminated even by diluting the original solution from 50% to less than about 20% of the active substance, because the products (often behenyl derivatives) have a pronounced tendency towards crystallization.

For comparison, a good prior art product is the homopolymer of a propoxylated tallow alcohol prepared in accordance with German No. 32 26 252. The pour point of a 50% stock solution in toluene is 0° C. The pour point depression for this material as determined by the test described in Example 5 is 8° C.

In addition to their low pour point, the polymeric pour point depressants of the present invention have the further advantage of a very low viscosity. Accordingly, they may be handled using conventional metering pumps, even at low temperatures.

Although certain embodiments of the present invention have been described in detail, it will be appreciated that other embodiments are contemplated along with modification of the disclosed features, as being within the scope of the invention, which is defined in the appended claims.

We claim:

1. An ester of an α,β-olefinically unsaturated carboxylic acid corresponding to the following formula

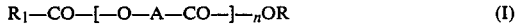

$$R_1\text{—CO—}[\text{—O—A—CO—}]_n\text{—OR} \qquad (I)$$

wherein $R_1$—CO— is an α,β-olefinically unsaturated carboxylic acid residue containing from 3 to 6 carbon atoms, R is a saturated or unsaturated hydrocarbon radical containing from 10 to 24 carbon atoms, —[—O—A—CO—]— is a residue or a hydroxycarboxylic acid having from 2 to 6 carbon atoms, A is an aliphatic radical having from 1 to 5 carbon atoms, and n is a number having a value of from 1 to 18.

2. The ester of claim 1, wherein the $R_1$—CO— residue is a residue of a carboxylic acid selected from the group consisting of acrylic acid, methacrylic acid, crotonic acid, fumaric acid, maleic acid, and mixtures thereof.

3. The ester of claim 1, wherein the hydroxycarboxylic acid is selected from the group consisting of monohydroxylated monocarboxylic acids and oligomers thereof.

4. The ester of claim 3 wherein the hydroxycarboxylic acid is selected from the group consisting of lactic acid, isomers of lactic acid, and oligomers of lactic acid.

5. The ester of claim 1, wherein n is a number having a value of from 2 to 10.

6. The ester of claim 5 wherein n is a number having a value of from 2 to 4.

7. The ester of claim 1, wherein the saturated or unsaturated hydrocarbon radical R is derived from a natural fatty alcohol containing from 10 to 24 carbon atoms.

8. The ester of claim 7 wherein the fatty alcohol has up to three double bonds.

9. The ester of claim 7 wherein the fatty alcohol contains from 12 to 18 carbon atoms.

10. The ester of claim 9 wherein the alcohol is tallow fatty alcohol.

11. The ester of claim 1, wherein the hydrocarbon radical R is derived from oligomerization products of ethylene containing a terminal OH-group.

12. The ester of claim 1 wherein the $R_1$—CO— residue is a residue of a carboxylic acid selected from the group consisting of acrylic acid, methacrylic acid, crotonic acid, fumaric acid, maleic acid, and mixtures thereof; the hydroxycarboxylic acid is selected from the group consisting of monohydroxylated monocarboxylic acids and oligomers therof; the saturated or unsaturated hydrocarbon radical R is derived from a natural fatty alcohol containing from 10 to 24 carbon atoms; and n is a number of from 2 to 10.

13. The ester of claim 12 wherein the fatty alcohol has up to three double bonds.

14. The ester of claim 12 wherein the fatty alcohol contains from 12 to 18 carbon atoms.

15. The ester of claim 12 wherein n is a number of from 2 to 4.

16. An adduct of an alcohol and a hydroxycarboxylic acid or a reactive derivative thereof corresponding to the following formula $$X-[-O-A-CO-]_n OR \qquad (II)$$

wherein

R is a saturated or unsaturated hydrocarbon radical containing from 10 to 24 carbon atoms, —[—O—A—CO—]— is a residue of a hydroxycarboxylic acid having from 2 to 6 carbon atoms, A is a aliphatic radical having from 1 to 5 carbon atoms, X is a hydrogen atom or a radical reactive under esterification conditions, and n is a number having a value of from 2 to 18.

17. The adduct of claim 16 wherein the group —[—O—A—CO—]—$_n$ is an oligomer of a monohydroxylated monocarboxylic acid.

18. The adduct of claim 17 wherein the oligomer is an oligomer of lactic acid.

19. The adduct of claim 16 wherein n is a number of from 2 to 10.

20. The adduct of claim 19 wherein n is a number of from 2 to 4.

21. The adduct of claim 16 wherein the saturated or unsaturated hydrocarbon radical R is derived from a natural fatty alcohol containing from 10 to 24 carbon atoms.

22. The adduct of claim 21 wherein the fatty alcohol has up to three double bonds.

23. The adduct of claim 21 wherein the fatty alcohol contains from 12 to 18 carbon atoms.

24. The adduct of claim 23 wherein the alcohol is tallow fatty alcohol.

25. The adduct of claim 16 wherein the hydrocarbon radical R is derived from oligomerization products of ethylene containing a terminal OH-group.

* * * * *